(12) United States Patent
Liu et al.

(10) Patent No.: US 10,555,307 B2
(45) Date of Patent: Feb. 4, 2020

(54) SYSTEM AND METHOD FOR BEAM FAILURE RECOVERY REQUEST REPORTING

(71) Applicant: FutureWei Technologies, Inc., Plano, TX (US)

(72) Inventors: Bin Liu, San Diego, CA (US); Pengfei Xia, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 190 days.

(21) Appl. No.: 15/880,022

(22) Filed: Jan. 25, 2018

(65) Prior Publication Data

US 2018/0368124 A1 Dec. 20, 2018

Related U.S. Application Data

(60) Provisional application No. 62/521,061, filed on Jun. 16, 2017.

(51) Int. Cl.
*H04W 36/30* (2009.01)
*H04W 72/04* (2009.01)
*H04W 72/12* (2009.01)
*H04W 74/08* (2009.01)

(52) U.S. Cl.
CPC ..... *H04W 72/046* (2013.01); *H04W 72/0413* (2013.01); *H04W 72/1284* (2013.01); *H04W 74/08* (2013.01)

(58) Field of Classification Search
CPC .................................................. H04W 36/305
See application file for complete search history.

(56) References Cited

U.S. PATENT DOCUMENTS

| 2011/0110227 A1* | 5/2011 | Yang | H04W 72/085 |
| | | | 370/228 |
| 2013/0182555 A1 | 7/2013 | Raaf et al. | |

(Continued)

FOREIGN PATENT DOCUMENTS

| CN | 101500279 A | 8/2009 |
| CN | 105144774 A | 12/2015 |

(Continued)

OTHER PUBLICATIONS

"Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications; High-speed Physical Layer in the 5 GHz Band," IEEE Std 802.11a-1999(R2003) (Supplement to IEEE Std 802.11-1999), Jun. 12, 2003, 91 pages.

(Continued)

*Primary Examiner* — Ayanah S George
(74) *Attorney, Agent, or Firm* — Slater Matsil, LLP

(57) ABSTRACT

A method for sending a beam failure recovery request (BFRQ) includes setting a demodulation symbol to a first value to specify a BFRQ signal, encoding the demodulation symbol with a first orthogonal code sequence, thereby producing an encoded first sequence of symbols, and send the encoded first sequence of symbols on a first physical uplink control channel (PUCCH) resource allocated for a first scheduling request (SR) transmission.

26 Claims, 8 Drawing Sheets

(56) References Cited

U.S. PATENT DOCUMENTS

2018/0227899 A1* 8/2018 Yu .................. H04B 7/0695
2018/0270689 A1* 9/2018 Akkarakaran ......... H04B 7/088

FOREIGN PATENT DOCUMENTS

EP          2544501 A1    12/2010
WO    2011141313 A3    11/2011

OTHER PUBLICATIONS

"IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 8: Medium Access Control (MAC) Quality of Service Enhancements," IEEE Computer Society, IEEE Std 802.11e-2005, Nov. 11, 2005, 211 pages.

* cited by examiner

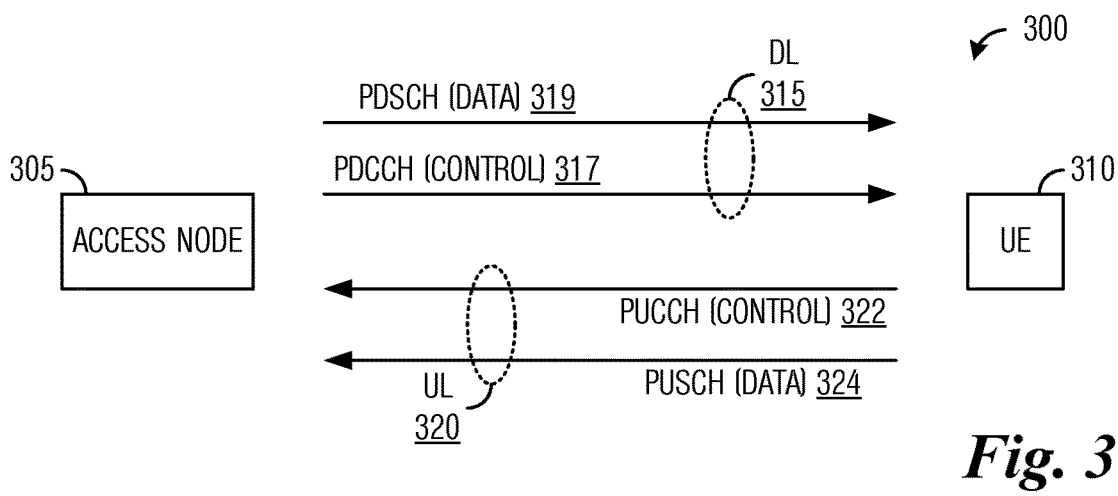
Fig. 3
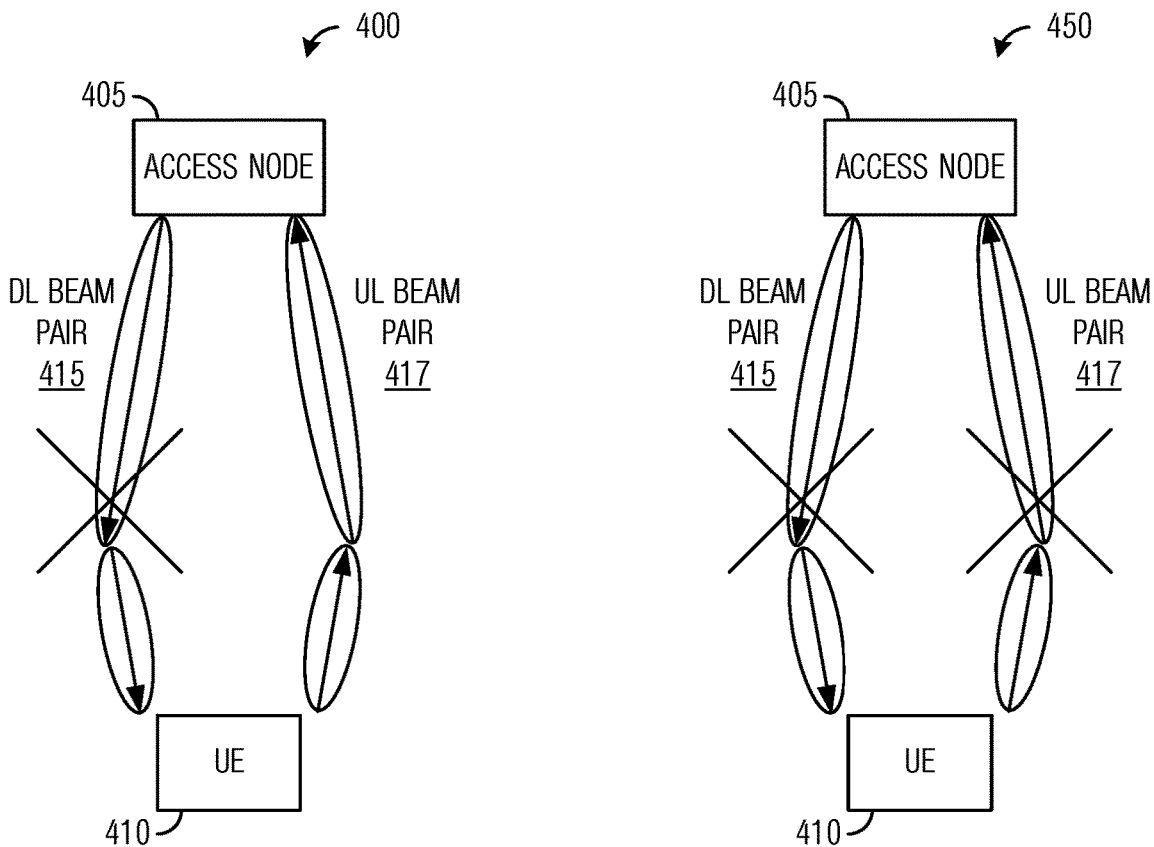
Fig. 4A  Fig. 4B

SYSTEM AND METHOD FOR BEAM FAILURE RECOVERY REQUEST REPORTING

This application claims the benefit of U.S. Provisional Application No. 62/521,061, filed on Jun. 16, 2017, entitled "System and Method for Beam Failure Recovery Request Reporting," which application is hereby incorporated herein by reference in its entirety.

TECHNICAL FIELD

The present disclosure relates generally to a system and method for digital communications, and, in particular embodiments, to a system and method for beam failure recovery request (BFRQ) reporting.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss.

However, even with beamforming, channels between devices, such as a user equipment (UE) and a next generation (NG) NodeB (gNB), are fragile and are prone to blockage, thereby becoming unreliable. In some situations, the best remedy for an unreliable channel is to replace the unreliable channel with another channel that is more reliable. In order to performing beam recovery, the unreliable channel needs to be detected and a beam failure recovery request (BFRQ) reported.

Therefore, there is a need for mechanisms supporting BFRQ reporting.

SUMMARY

Example embodiments provide a system and method for beam failure recovery request (BFRQ) reporting.

In accordance with an example embodiment, a method for sending a BFRQ is provided. The method includes setting, by a receiving device, a demodulation symbol to a first value to specify a BFRQ signal, encoding, by the receiving device, the demodulation symbol with a first orthogonal code sequence, thereby producing an encoded first sequence of symbols, and sending, by the receiving device, the encoded first sequence of symbols on a first physical uplink control channel (PUCCH) resource allocated for a first scheduling request (SR) transmission.

Optionally, in any of the preceding embodiments, an embodiment further includes applying, by the receiving device, a cyclic time shift to the encoded first sequence of symbols.

Optionally, in any of the preceding embodiments, an embodiment further includes setting, by a receiving device, a second demodulation symbol to a second value to specify a SR signal, encoding, by the receiving device, the second demodulation symbol with a second orthogonal code sequence, thereby producing an encoded second sequence of symbols, and sending, by the receiving device, the encoded second sequence of symbols on a second PUCCH resource allocated for a second SR transmission.

Optionally, in any of the preceding embodiments, an embodiment wherein the first orthogonal code sequence and the second orthogonal code sequence are one and the same.

Optionally, in any of the preceding embodiments, an embodiment wherein the first orthogonal code sequence and the second orthogonal code sequence are different.

Optionally, in any of the preceding embodiments, an embodiment wherein the first value comprises a −1 and the second value comprises a +1.

Optionally, in any of the preceding embodiments, an embodiment further includes receiving, by the receiving device, a first resource allocation, and sending, by the receiving device, candidate beam information in accordance with the first resource allocation.

Optionally, in any of the preceding embodiments, an embodiment further includes receiving, by the receiving device, a second resource allocation, and sending, by the receiving device, a buffer status report (BSR) in accordance with the second resource allocation.

Optionally, in any of the preceding embodiments, an embodiment further includes receiving, by the receiving device, a configuration of the BFRQ.

Optionally, in any of the preceding embodiments, an embodiment wherein the configuration is received in system information.

In accordance with an example embodiment, a method for operating a receiving device in a communications system with multiple component carriers is provided. The method includes detecting, by the receiving device, a beam failure in a first component carrier, generating, by the receiving device, a BFRQ, and sending, by the receiving device, the BFRQ in a second component carrier.

Optionally, in any of the preceding embodiments, an embodiment wherein BFRQ sent using an uplink control channel or a non-contention based channel.

Optionally, in any of the preceding embodiments, an embodiment wherein the uplink control channel comprises a PUCCH, and wherein the BFRQ is sent in the PUCCH in one of a modified SR PUCCH format, a modified CSI PUCCH format, or a modified acknowledgement (ACK)/negative ACK (NACK) PUCCH format.

Optionally, in any of the preceding embodiments, an embodiment wherein the non-contention based channel comprises a physical random access channel (PRACH).

Optionally, in any of the preceding embodiments, an embodiment wherein generating the BFRQ includes setting, by the receiving device, a demodulation symbol to a first value to specify a BFRQ signal, and encoding, by the receiving device, a demodulation symbol with an orthogonal code sequence thereby producing an encoded sequence of symbols, wherein the orthogonal code sequence conveys information related to an index of the first component carrier.

Optionally, in any of the preceding embodiments, an embodiment wherein sending the BFRQ comprises sending the encoded sequence of symbols in the second component carrier.

In accordance with an example embodiment, a receiving device is provided. The receiving device includes one or more processors, and a computer readable storage medium storing programming for execution by the one or more processors. The programming including instructions to configure the receiving device to set a demodulation symbol to a first value to specify a beam failure recovery request (BFRQ) signal, encode the demodulation symbol with a first orthogonal code sequence, thereby producing an encoded first sequence of symbols, and send the encoded first sequence of symbols on a first physical uplink control channel (PUCCH) resource allocated for a first scheduling request (SR) transmission.

Optionally, in any of the preceding embodiments, an embodiment wherein the programming includes instructions to configure the receiving device to apply a cyclic time shift to the encoded first sequence of symbols.

Optionally, in any of the preceding embodiments, an embodiment wherein the programming includes instructions to configure the receiving device to set a second demodulation symbol to a second value to specify a SR signal, encode the second demodulation symbol with a second orthogonal code sequence, thereby producing an encoded second sequence of symbols, and send the encoded second sequence of symbols on a second PUCCH resource allocated for a second SR transmission.

Optionally, in any of the preceding embodiments, an embodiment wherein the programming includes instructions to configure the receiving device to receive a first resource allocation, and send candidate beam information in accordance with the first resource allocation.

Optionally, in any of the preceding embodiments, an embodiment wherein the programming includes instructions to configure the receiving device to receive a second resource allocation, and send a BSR in accordance with the second resource allocation.

In accordance with an example embodiment, a receiving device is provided. The receiving device includes one or more processors, and a computer readable storage medium storing programming for execution by the one or more processors. The programming including instructions to configure the receiving device to detect a beam failure in a first component carrier of a communications system with multiple component carriers, generate a BFRQ, and send the BFRQ in a second component carrier.

Optionally, in any of the preceding embodiments, an embodiment wherein BFRQ sent using an uplink control channel or a non-contention based channel.

Optionally, in any of the preceding embodiments, an embodiment wherein the uplink control channel comprises a PUCCH, and wherein the BFRQ is sent in the PUCCH in one of a modified SR PUCCH format, a modified CSI PUCCH format, or a modified ACK/NACK PUCCH format.

Optionally, in any of the preceding embodiments, an embodiment wherein the programming includes instructions to configure the receiving device to set a demodulation symbol to a first value to specify a BFRQ signal, and encode a demodulation symbol with an orthogonal code sequence thereby producing an encoded sequence of symbols, wherein the orthogonal code sequence conveys information related to an index of the first component carrier.

Optionally, in any of the preceding embodiments, an embodiment wherein the programming includes instructions to configure the receiving device to send the encoded sequence of symbols in the second component carrier.

Practice of the foregoing embodiments enables the reporting of BFRQs on PUCCHs in single carrier and multi-carrier deployments.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates an example communications system, highlighting channels between communicating devices according to example embodiments described herein;

FIGS. 4A and 4B illustrate an example communications system, highlighting potential beam failure scenarios according to example embodiments described herein;

DETAILED DESCRIPTION OF ILLUSTRATIVE EMBODIMENTS

The making and using of the example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
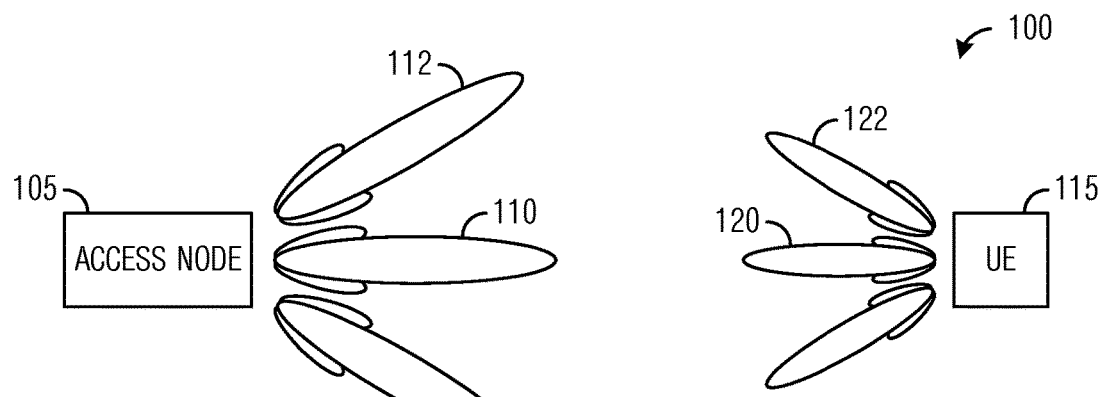
FIG. 1 illustrates an example wireless communications system according to example embodiments described herein.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as evolved NodeBs (eNBs), base stations, NodeBs, master eNBs (MeNBs), secondary eNBs (SeNBs), next generation (NG) NodeBs (gNBs), master gNBs (MgNBs), secondary gNBs (SgNBs), remote radio heads, access points, and the like, while UEs may also be commonly referred to as mobiles, mobile stations, terminals, subscribers, users, stations, and the like.

While it is understood that communications systems may employ multiple access nodes capable of communicating with a number of UEs, only one access node and one UE are illustrated for simplicity.

As discussed previously, pathloss in communications systems operating at a high frequency (HF) (6 gigahertz (GHz) and above, such as millimeter wavelength (mm-Wave)) is common, and beamforming may be used to overcome the high amount of pathloss. As shown in FIG. 1, both access node 105 and UE 115 communicate using beamformed transmissions and receptions. As an example access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a transmit-receive point (TRP) may rely on non-codebook based precoding to form certain radiation patterns to transmit downlink signals or receive uplink signals.

A variety of limitations exist that may limit the performance of a UE, the limitations include:

Electromagnetic coupling: The electric currents on the surface of the antenna of the UE induce various forms of electric magnetic coupling, which affects the characteristic impedance and antenna aperture efficiency;

Physical size: In general, the display panel and battery of a UE occupy the largest percentage of the volume of the UE, while various other devices (including sensors, cameras, speakers, etc.) also take up a significant portion of the remaining volume and are usually placed on the edges of the UE. Antennas (third generation (3G), fourth generation (4G), fifth generation (5G) new radio (NR), and so on) are also present. Power consumption, heat dissipation, and so forth, also have an impact on physical size;

Usage: The intended usage of the UE also has an impact on the performance of UE; As an example, the hand of the user may reduce the gain of the antenna array by an average of 10 dB when it completely encompasses the array; and Antenna array configuration: Multiple antenna arrays may be used; potentially requiring multiple radio frequency (RF) integrated circuits (ICs) and a single baseband (BB) IC (BBIC).

It is noted that the movement of the UE may lead to significant degradation in the signal quality. However, the movement may be detected using a variety of sensors, including:

Three dimensional (3D) gyroscopes with a root mean squared (RMS) noise on the order of 0.04 degrees per second;

3D accelerometers with a RMS noise on the order of 1 milli-g; and

Magnetometers.

If the movement of the UE is known, it may possible to quickly track the beams used by the UE. Table 1 presents a summary of example angular displacements for typical activities.

TABLE 1

Summary of example angular displacements for typical activities.

| Activity | Angular Displacement (in 100 milliseconds of degree) |
|---|---|
| Reading or web browsing | 6-11 |
| Horizontal to vertical changes | 30-36 |
| Playing games | 72-80 |

Figure 2:
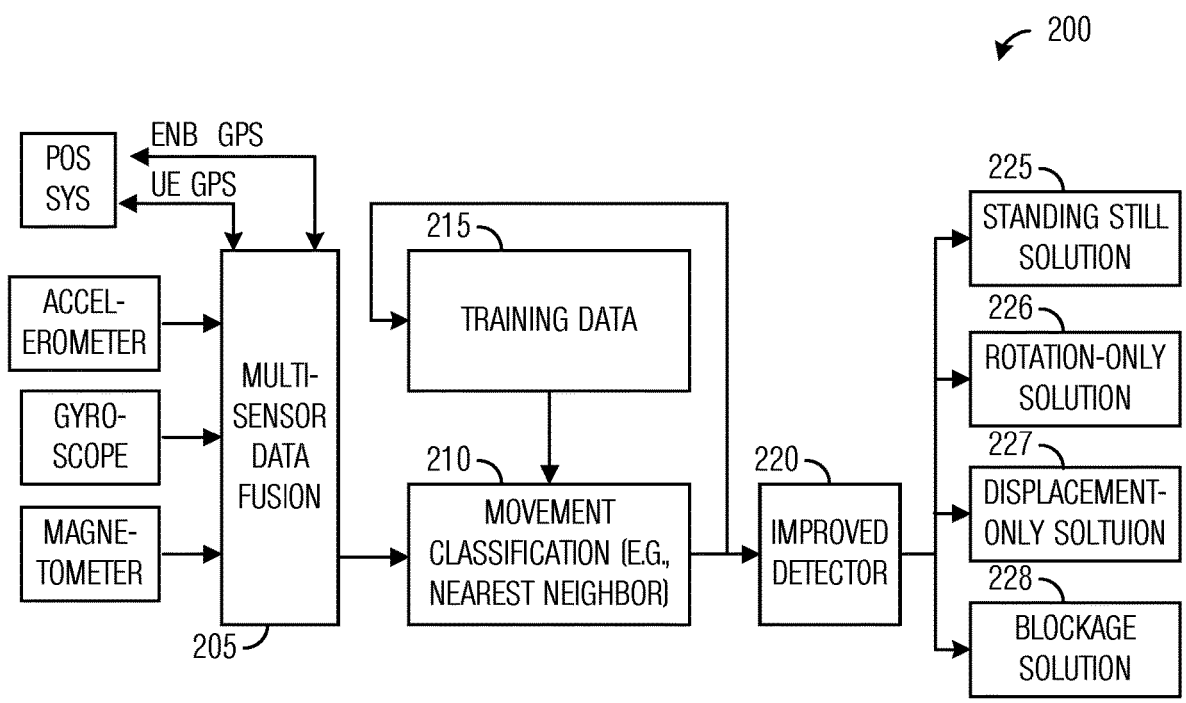
FIG. 2 illustrates an example beam tracking system according to example embodiments described herein.

FIG. 2 illustrates an example beam tracking system 200. Beam tracking system 200 may be located in a UE, for example. Beam tracking system 200 uses data from one or more sensors (including position information from information assisted positioning systems (such as a Global Positioning System (GPS)), 3G gyroscopic information, 3D accelerometer information, magnetometer information, and so on) to perform beam tracking. Position information from information assisted positioning systems, in addition to information from motion sensors, may lead to improved motion detection, accuracy, and reliability. A data unit 205 receives sensor data and processes the data, providing the processed data to a movement classification unit 210 that classifies the type of movement the UE is undergoing. Movement classification unit 210 also receives information from a training data unit 215 that provides information to movement classification unit 210 based on historical data to help in the classification of the movement of the UE. The classified movement is provided to a detector 220. Detector 220 may consider if the movement of the UE warrants beam tracking adjustments. Should beam tracking adjustments be warranted, beam tracking adjustment solutions are generated. Examples of solutions include a beam adjustment for a situation where the UE is standing still 225, a beam adjustment for a situation where the UE is rotating 226, a beam adjustment for a situation where the UE is experiencing a displacement 227, and a beam adjustment for a situation where the UE is blocked 228.

FIG. 3 illustrates an example communications system 300, highlighting channels between communicating devices. Communications system 300 includes an access node 305 serving a UE 310. Access node 305 and UE 310 communicate over uni-directional channels. A downlink (DL) channel 315 is used for communications from access node 305 to UE 310 and an uplink (UL) channel 320 is used for communications from UE 310 to access node 305. In general, a channel includes one or more channels conveying control (hereby referred to herein as control channels) and one or more channels conveying data (hereby referred to herein as data channels). As shown in FIG. 3, DL channel 315 includes a physical downlink control channel (PDCCH) 317 for conveying control, while a physical downlink shared channel (PDSCH) 319 is used for conveying data. Similarly, UL channel 320 includes a physical uplink control channel (PUCCH) 322 for conveying control, while a physical uplink shared channel (PUSCH) 324 is used for conveying data. It is noted that DL channel 315 and UL channel 320 may also include control channels or data channels other than those shown in FIG. 3.

In Third Generation Partnership Project (3GPP) Radio Access Network Working Group 1 (RAN1) meeting #89, mechanisms to recover from beam failure were discussed and the following agreements were made:

Support the following channel(s) for beam failure recovery request (BFRQ) transmission:

Non-contention based channel based on physical random access channel (PRACH), which uses a resource orthogonal to resources of other PRACH transmissions, at least for the frequency division multiplexing (FDM) case.

Other ways of achieving orthogonality, e.g., code division multiplexing (CDM) or time division multiplexing (TDM) with other PRACH resources are for further study.

Whether or not having sequence or format different from those of PRACH for other purposes is for further study.

It is noted that this does not prevent PRACH design optimization for BFRQ transmission from other agenda items.

Retransmission behavior on this PRACH resource is similar to regular random access channel (RACH) is also for further study.

Support using PUCCH for BFRQ transmission.

Whether the PUCCH is with beam sweeping or not is for further study.

It is noted that this may or may not impact PUCCH design.

It is further agreed that the PUCCH can be used for BFRQ reporting.

FIGS. 4A and 4B illustrate an example communications system 400, highlighting potential beam failure scenarios. Communications system 400 includes an access node 405 serving a UE 410. Access node 405 and UE 410 communicate using a DL beam pair 415 and an UL beam pair 417. Each beam pair comprises a communications beam associated with access node 405 and a communications beam associated with UE 410. A failure of either or both communications beams of a communications beam pair will result in beam failure of the communications beam pair. A beam failure may also be referred to as a link failure.

As shown in FIG. 4A, DL beam pair 415 is faulty while UL beam pair 417 remains operable. In such a situation, PUCCH resources may still be available, which may be originally allocated for channel state information (CSI) reporting or scheduling request (SR) or ACK/NACK reporting. UE 410 may use a PUCCH resource for BFRQ reporting.

As shown in FIG. 4B, both DL beam pair 415 and UL beam pair 417 are faulty. In such a situation, UE 417 may still attempt to use a PUCCH resource for BFRQ reporting, but it is unlikely that the BFRQ report will reach access node 405.

A receiving device (such as a UE) monitors transmissions (e.g., control channels, data channels, or reference signals) to trigger beam recovery. A UE may monitor control channels, data channels, the SS, the CSI-RS, and the PDCCH DMRS, for example, to detect an unreliable beam and trigger a beam recovery. The UE derives a measure of the reliability of a channel based on information gathered from the monitoring of control channels, data channels, or reference signals. As an example, the reliability measure is a result of a decoding attempt (either success or failure) of a channel. As another example, the reliability measure is a measure of the quality or strength of the signal, such as a reference signal received power (RSRP) value, a reference signal received quality (RSRQ) value, a received signal strength, a received signal strength indicator (RSSI), a signal to noise ratio (SNR), a signal plus interference to noise ratio (SINR), and so on. A sliding window may be applied to the measure of the reliability of the channel to capture the dynamic nature of the reliability of the channel. In a situation where the receiving device is not a UE, the receiving device may monitor channels, and signals (reference signals) to detect an unreliable beam and trigger a beam recovery.

Figure 5:
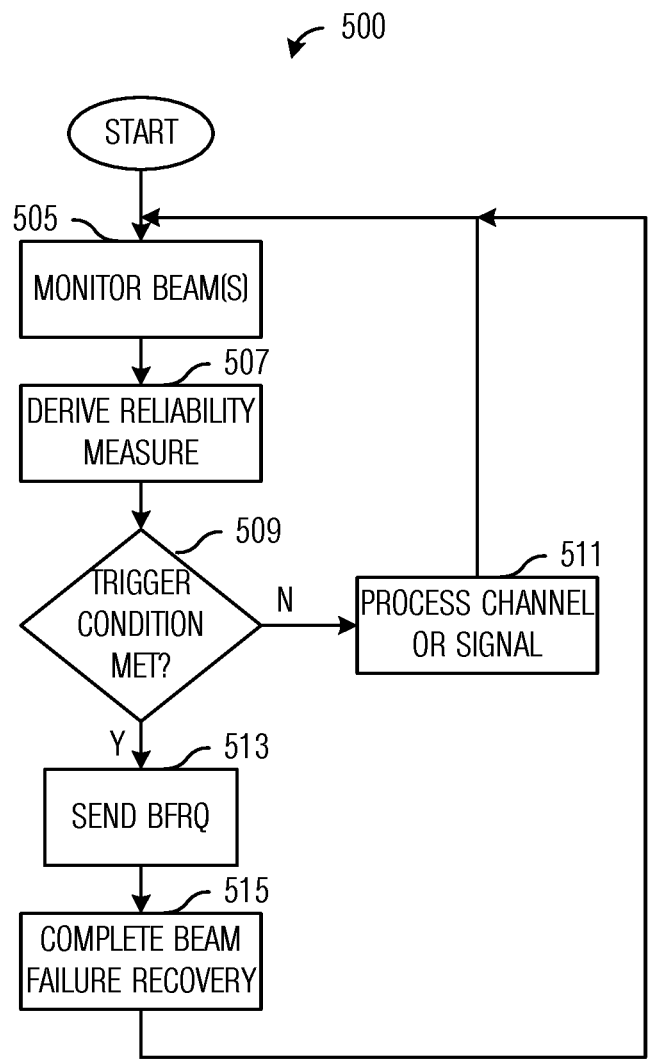
FIG. 5 illustrates a flow diagram of example operations occurring in a receiving device monitoring channels or signals to potentially detect an unreliable channel and trigger beam recovery according to example embodiments described herein.

FIG. 5 illustrates a flow diagram of example operations 500 occurring in a receiving device monitoring channels or signals to potentially detect an unreliable channel and trigger beam recovery. Operations 500 may be indicative of operations occurring in a receiving device as the receiving device is monitoring channels or signals to potentially detect an unreliable channel and trigger beam recovery.

Operations 500 begin with the receiving device monitoring one or more beams by detecting a channel or a signal transmitted in the beams (block 505). In a situation where the receiving device is a UE, the UE may monitor downlink control channels, downlink data channels, or reference signals, such as SS, CSI-RS, PDCCH DMRS, and so on. In a situation where the receiving device is an access node, the access node may monitor uplink control channels, uplink data channels, or uplink reference signals, such as sounding reference signals (SRS). The receiving device derives a reliability measure of the monitored one or more beams (block 507). As an example, the reliability measure is a result of a decoding attempt (either success or failure) of a channel. As another example, the reliability measure is a measure of the quality or strength of the signal, such as a RSRP value, a RSRQ value, a received signal strength, a RSSI, a SNR, a SINR, and so on. The receiving device performs a check to determine if a trigger condition is met based on the reliability measure (block 509). Example trigger conditions include comparisons of the reliability measure (e.g., decoding performance, signal quality, signal strength, or combinations thereof) with thresholds. The trigger condition is met when the threshold is satisfied. If the trigger condition is not met, the receiving device processes the channel or signal (block 511) and returns to block 505 to continue monitoring the one or more beams.

If the trigger condition is met, the receiving device triggers beam recovery by sending a BFRQ (block 513). The receiving device completes the beam failure recovery procedure (block 515). If the receiving device is an access node, completing the beam failure recovery procedure may include the access node setting up a new channel in a new beam, while if the receiving device is a UE, completing the beam failure recovery procedure may include the UE detecting a new beam and recovering the link along the newly detected beam. In either situation, a new connection may be established between the receiving device and the transmitting device on the new beam to replace the failed beam. The receiving device returns to block 505 to continue monitoring a transmission on the new beam.

According to an example embodiment, techniques for BFRQ reporting using a SR-based PUCCH format are provided. In 3GPP Long Term Evolution (LTE) technical standards, different PUCCH formats for SR reporting, acknowledgement/negative acknowledgement (ACK/NACK) reporting, as well as CSI reporting are provided. The structure of the SR PUCCH format 1 is the same as that of the ACK/NACK PUCCH formats 1a or 1b, where a cyclic time shift of a base reference signal sequence is modulated with time-domain orthogonal block spreading. The SR report of 3GPP LTE uses simple On-Off keying, with a UE that is sending a SR report using a modulation symbol d(0)=+1, and a UE that is not sending a SR report transmitting nothing (i.e., a negative SR report). Additionally, the SR report may be multiplexed with an ACK/NACK report (such as in PUCCH formats 1a or 1b, for example) in the same PUCCH region.

According to an example embodiment, a BFRQ is multiplexed with a SR. As an illustrative example, instead of using On-Off keying as in the SR PUCCH format 1, 1-bit of information is carried in the SR. An example of such an implementation using the extension of the SR PUCCH format 1 of 3GPP LTE involves the receiving device using a demodulation symbol d(0)=+1 (e.g., binary zero) to send a SR and demodulation symbol d(0)=−1 (e.g., binary 1) to send a BFRQ. If the receiving device is not sending either a SR or a BFRQ, the receiving device sends nothing. It is noted that the SR and the BFRQ share a common orthogonal code sequence and cyclic time shift. Additionally, similar to 3GPP LTE PUCCH formats 1a or 1b, the modified SR PUCCH format with support for BFRQ can also be multiplexed with ACK/NACK report in the same PUCCH region.

Figures 6A, 6B:
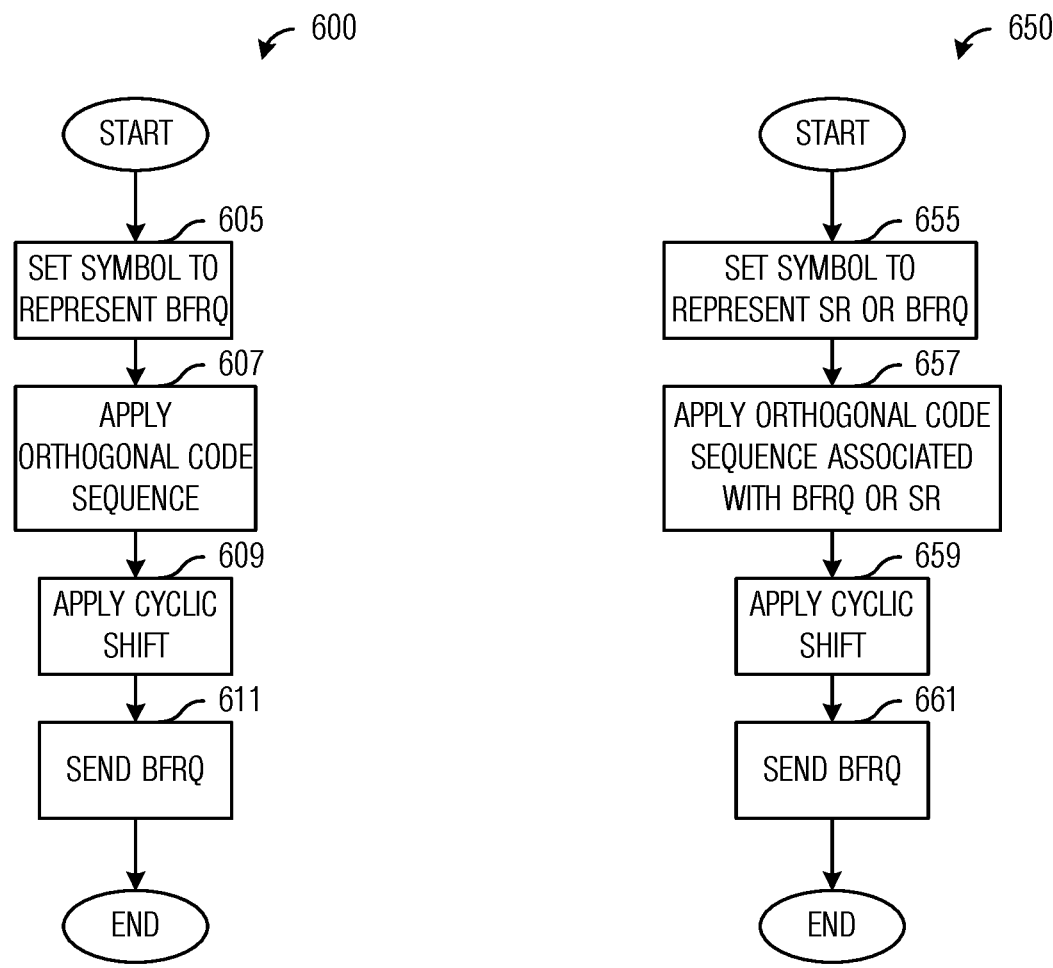
FIG. 6A illustrates a flow diagram of first example operations occurring in a receiving device sending a BFRQ using a modified SR-based PUCCH format according to example embodiments described herein.
FIG. 6B illustrates a flow diagram of second example operations occurring in a receiving device sending a BFRQ using a modified SR-based PUCCH format according to example embodiments described herein.

FIG. 6A illustrates a flow diagram of first example operations 600 occurring in a receiving device sending a BFRQ using a modified SR PUCCH format. Operations 600 may be indicative of operations occurring in a receiving device as the receiving device sends a BFRQ using a modified SR PUCCH format.

Operations 600 begin with the receiving device setting a demodulation symbol to represent a BFRQ (block 605). As an example, the receiving device sets the demodulation symbol to −1 or a binary +1 to represent a BFRQ, depending on implementation. If the receiving device is sending a SR, the receiving device may set the demodulation symbol to +1 or a binary 0 to represent a SR, depending on implementation. The receiving device applies, to the demodulation symbol, an orthogonal code sequence (block 607) and a cyclic time shift (block 609), thereby producing an encoded sequence of symbols. The receiving device sends the BFRQ by transmitting the encoded sequence of symbols (block 611).

According to an example embodiment, a BFRQ is sent independently using a modified format of the SR PUCCH format. In such an implementation, the SR and BFRQ will use different orthogonal code sequences, while the cyclic time shift may be the same. As an illustrative example, a receiving device sending a SR uses a demodulation symbol d(0)=+1 and applies a first orthogonal code sequence to the demodulation symbol, while a receiving device sending a BFRQ uses the same demodulation symbol d(0)=+1 but applies a second orthogonal code sequence to the demodulation symbol. With either a SR or a BFRQ, the cyclic time shift may be the same.

FIG. 6B illustrates a flow diagram of second example operations 650 occurring in a receiving device sending a BFRQ using a modified SR PUCCH format. Operations 650 may be indicative of operations occurring in a receiving device as the receiving device sends a BFRQ using a modified SR PUCCH format.

Operations 650 begin with the receiving device setting a demodulation symbol to represent a SR or BFRQ (block 655). As an example, the receiving device sets the demodulation symbol to +1 (or −1, depending on implementation) to represent either a SR or BFRQ. The receiving device applies a first orthogonal code sequence associated with the BFRQ to the demodulation symbol (block 657). If instead of a BFRQ, the receiving device is sending a SR, the receiving device applies a second orthogonal code sequence associated with the SR to the demodulation symbol. It is noted that the first orthogonal code sequence is different from the second orthogonal code sequence. The receiving device applies a cyclic time shift (block 659) and sends the BFRQ (block 661). It is noted that the cyclic time shift may be independent of BFRQ or SR. In other words, the same cyclic time shift is use for the BFRQ and the SR.

According to an example embodiment, a configuration of the BFRQ format to use is signaled to the UE in system information. As an illustrative example, the configuration of the BFRQ format includes which format to use (either BFRQ multiplexed with SR or BFRQ and SR using the same format but different orthogonal code sequences, for example), an orthogonal code sequence to use for BFRQs, an orthogonal code sequence to use for SRs (if needed), a cyclic time shift to use, and so on.

According to an example embodiment, the receiving device sends the BFRQ in the modified SR PUCCH format on a previously assigned PUCCH resource allocated for SRs. As an example, the BFRQ is sent in a format similar to the 3GPP LTE SR PUCCH format 1 with modifications to support the BFRQ. As an example, an existing On-off keying transmission technique used for SR transmissions is changed to the multiplexed SR-BFRQ PUCCH format discussed previously to convey one bit of information.

According to an example embodiment, the receiving device sends the BFRQ in the modified SR PUCCH format on a previously assigned PUCCH resource allocated for CSI or ACK/NACK messaging. As an example, because the beam has failed, there is no need for CSI or ACK/NACK reporting (i.e., messaging). The PUCCH resources allocated for CSI or ACK/NACK reports may be reused for the transmission of the BFRQ instead.

With respect to the access node receiving the BFRQ in a PUCCH resource allocated for CSI or ACK/NACK reporting, the access node may perform blind detection on the PUCCH resources to find the BFRQ. As an example, once the access node fails at decoding the PUCCH resource allocated for CSI reporting as a CSI message, the access node may further perform blind detection to determine if the PUCCH resource is carrying a BFRQ.

According to an example embodiment, a receiving device sends a BFRQ in the modified SR PUCCH format on candidate beams. In a beamformed communications system, a situation may arise where beams are detected by the receiving device and can be used for data transmission, but are not currently being used. These beams are referred to as candidate beams. Because there are no PUCCH resources allocated for the receiving device in the candidate beams, a contention-based PUCCH transmission mechanism may be used to transmit the BFRQ in the modified SR PUCCH format when using the candidate beams. In order to maximize the likelihood of successful BFRQ reception, the receiving device may send the BFRQ on multiple candidate beams. As an example, the receiving device sends the BFRQ on all candidate beams or a subset of all candidate beams.

Figure 7A:
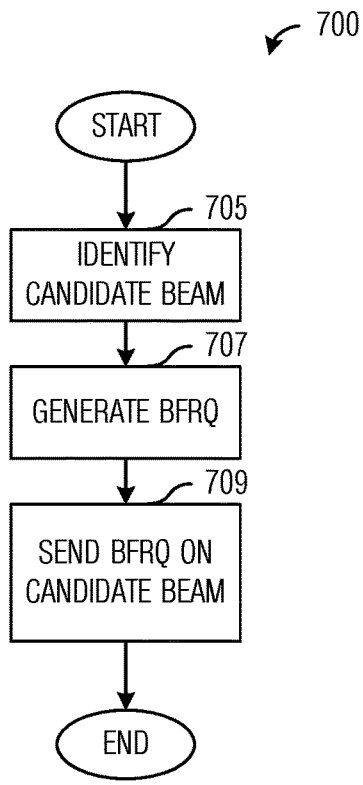
FIG. 7A illustrates a flow diagram of example operations occurring in a receiving device using candidate beams to send a BFRQ according to example embodiments described herein.

FIG. 7A illustrates a flow diagram of example operations 700 occurring in a receiving device using candidate beams to send a BFRQ. Operations 700 may be indicative of operations occurring in a receiving device as the receiving device uses candidate beams to send a BFRQ.

Operations 700 begin with the receiving device identifying a candidate beam (block 705). The receiving device generates a BFRQ (block 707) and sends the BFRQ on the candidate beam (block 709). The BFRQ may follow the modified SR PUCCH format. As discussed previously, in a situation where the receiving device identifies a plurality of candidate beams, the receiving device may send the BFRQ on a subset of the plurality of candidate beams.

According to an example embodiment, the receiving device reports candidate beams after receiving BFRQ response from the access node. The access node may allocate PUSCH resource(s) to the receiving device in BFRQ response to permit the receiving device to report the candidate beam(s) that it is able to detect. The PUSCH resource may be conveyed in a DL control channel.

Figure 7B:
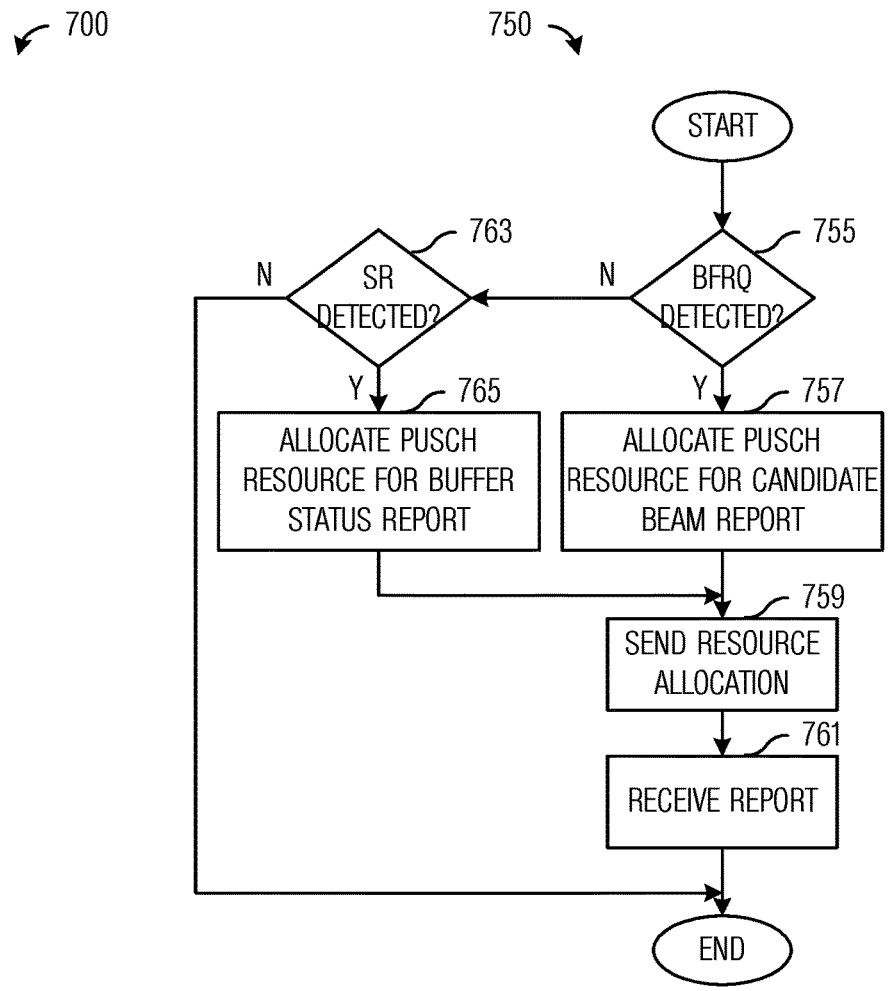
FIG. 7B illustrates a flow diagram of example operations occurring in an access node allocating PUSCH resources to a receiving device according to example embodiments described herein.

FIG. 7B illustrates a flow diagram of example operations 750 occurring in an access node allocating PUSCH resources to a receiving device. Operations 750 may be indicative of operations occurring in an access node as the access node allocates PUSCH resources to a receiving device to report candidate beams or buffer status.

Operations 750 begin with the access node performing a check to determine if a BFRQ has been detected (block 755). If the BFRQ has been detected, the access node allocates a PUSCH resource to the receiving device to enable the receiving device to report candidate beams or information thereof (block 757). The access node sends the resource allocation to the receiving device (block 759) and receives the report, e.g., the candidate beams report, in accordance with the resource allocation (block 761).

If the BFRQ has not been detected, the access node performs a check to determine if an SR has been detected (block 763). If an SR has been detected, the access node allocates a PUSCH resource to the receiving device to enable the receiving device to send a BSR or information related thereto (block 765). The access node sends the resource allocation to the receiving device (block 759) and receives the report, e.g., the BSR, in accordance with the resource allocation (block 761).

In an embodiment, while the access node is allocating a PUSCH resource for the candidate beam report, the access node may also allocate PUSCH resource for the BSR.

According to an example embodiment, techniques for BFRQ reporting in a multi-carrier communications system are provided. In a multi-carrier communications system, the receiving device may be configured with multiple component carriers in the DL and UL. UEs in each component carrier may be configured with both DL and UL, or DL only, or UL only. If a beam failure occurs and is detected in one of the component carriers, a BFRQ may be sent in another component carrier. It is noted that the component carriers may be in the same frequency band or in different frequency bands. As an illustrative example a first subset of component carriers is in a high frequency (HF) band and a second subset of component carriers is in a low frequency (LF) band.

According to an example embodiment, the BFRQ in a multi-carrier communications system is in a modified SR PUCCH format. Any of the modified SR PUCCH formats presented herein are operable in a multi-carrier communications system. According to an example embodiment, the BFRQ is in a modified CSI PUCCH format. Any of the modified CSI PUCCH formats presented herein are operable in a multi-carrier communications system.

According to an example embodiment, the BFRQ in a multi-carrier communications system is in a PRACH-like format. When beam failure is detected in one component carrier, a PRACH-like BFRQ is sent in the other component carrier.

According to an example embodiment, techniques utilizing candidate beams are operable in a multi-carrier communications system. Any of the candidate beam techniques for BFRQ reporting presented herein are operable in a multi-carrier communications system.

Figure 8:
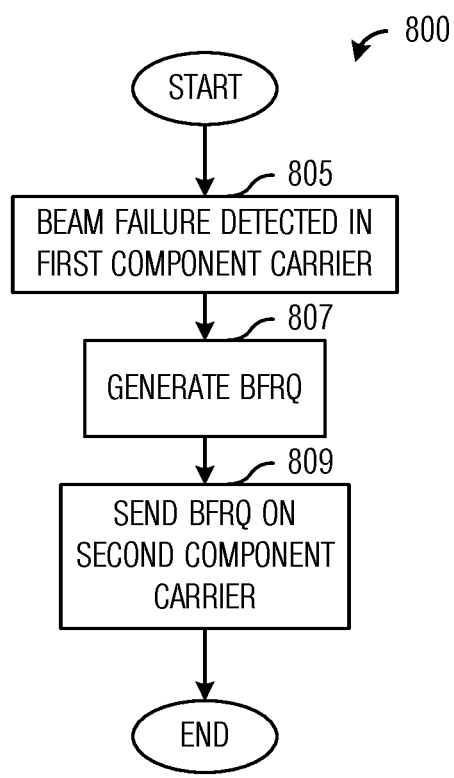
FIG. 8 illustrates a flow diagram of example operations occurring in a receiving device operating in a multi-carrier communications system according to example embodiments described herein.

FIG. 8 illustrates a flow diagram of example operations 800 occurring in a receiving device operating in a multi-carrier communications system. Operations 800 may be indicative of operations occurring in a receiving device as the receiving device operates in a multi-carrier communications system.

Operations 800 begin with the receiving device detecting a beam failure in a first component carrier (block 805). The receiving device generates a BFRQ (block 807) and sends the BFRQ on a second component carrier (block 809). In a situation where the BFRQ is in the modified SR PUCCH format, a unique orthogonal code sequence may be applied to the demodulation symbol to represent the index of the failed component carrier. The index of the failed component carrier can also be reported late in a PUSCH resource together with candidate beams or a BSR in the second component carrier scheduled by access node in a BFRQ response, for example. Candidate beam information of the first component carrier (the failed component carrier) may also be reported in the second component carrier (or any other available component carrier). The reporting of the candidate beam information may be in accordance with any of the techniques presented herein. In a situation where the BFRQ is in the modified CSI PUCCH formats, the component carrier index may be included in PUCCH content, along with candidate beam information.

According to an example embodiment, if a beam failure occurs and is detected in one of the component carriers, a BFRQ may be sent in another component carrier. If no PUCCH resource is allocated for the receiving device, a grant-free contention-based PUCCH-based BFRQ report can be conducted in another component carrier, where the BFRQ is in the modified SR or CSI PUCCH formats. Or, a PRACH-like BFRQ report can be conducted in another component carrier.

Figure 9:
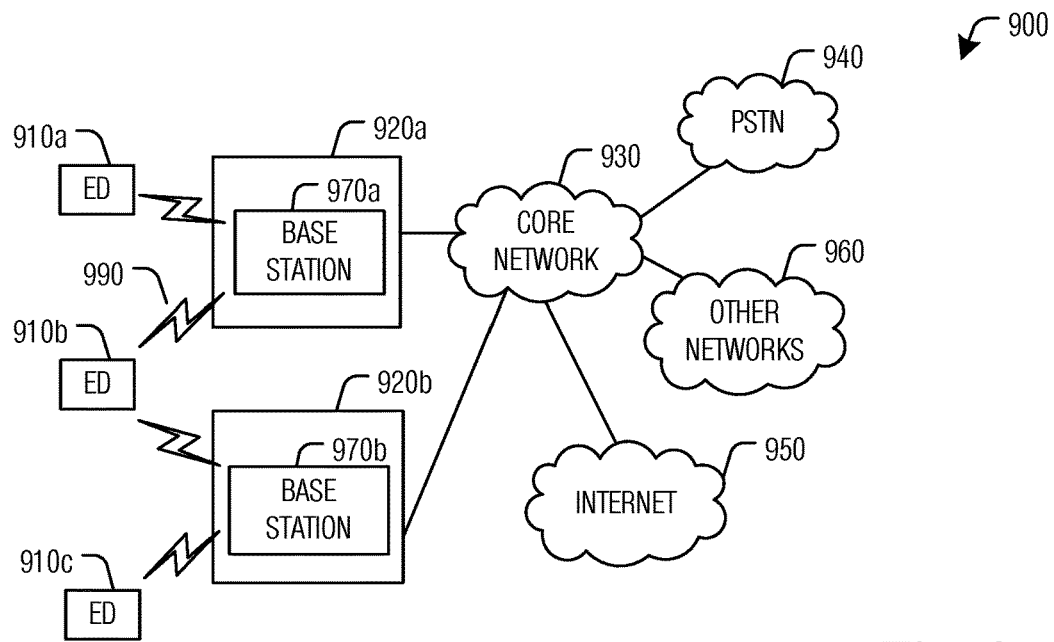
FIG. 9 illustrates an example communication system according to example embodiments described herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, or the other networks 960. For example, the base stations 970a-970b may include (or be)

one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 910a-910c are configured to interface and communicate with the Internet 950 and may access the core network 930, the PSTN 940, or the other networks 960.

In the embodiment shown in FIG. 9, the base station 970a forms part of the RAN 920a, which may include other base stations, elements, or devices. Also, the base station 970b forms part of the RAN 920b, which may include other base stations, elements, or devices. Each base station 970a-970b operates to transmit or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement LTE, LTE-A, or LTE-B. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910a-910c may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
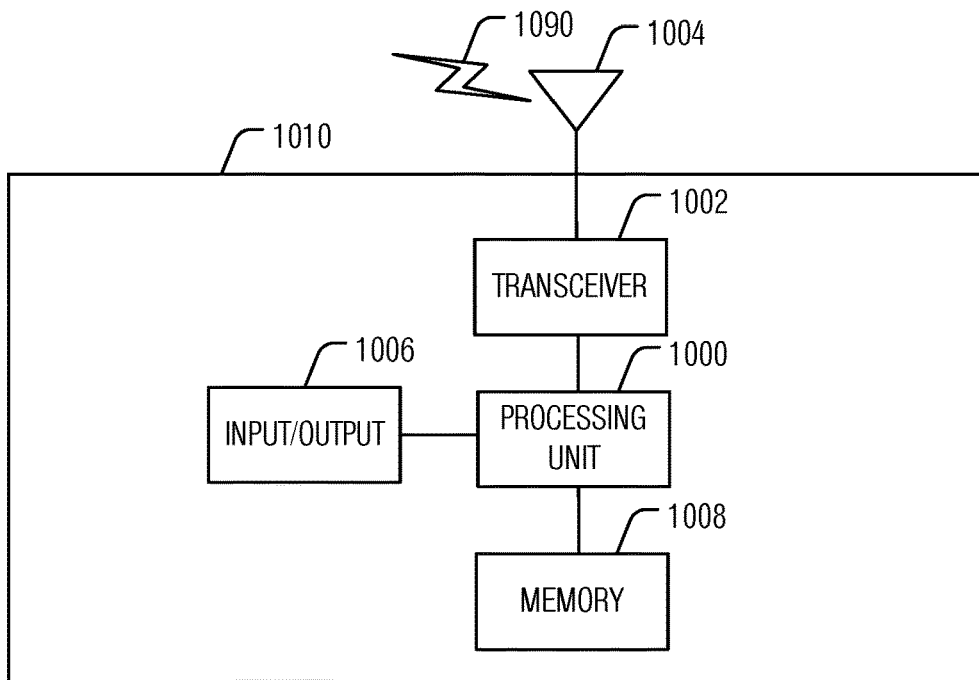
FIGS. 10A and 10B illustrate example devices that may implement the methods and teachings according to this disclosure.
Figure 10B:
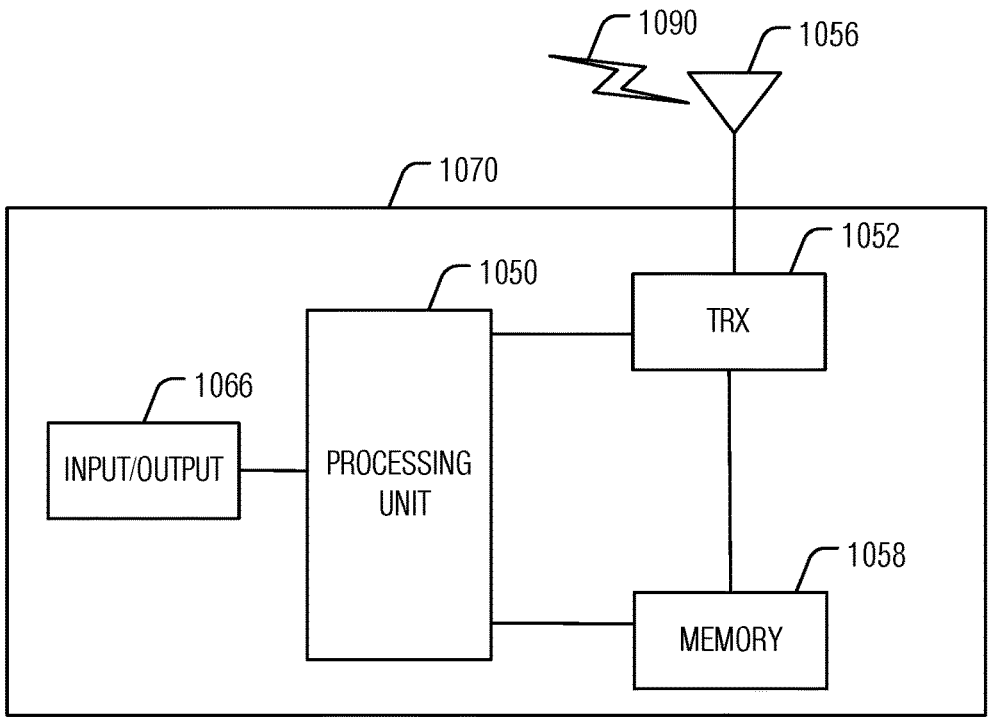

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving/providing information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) woo and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
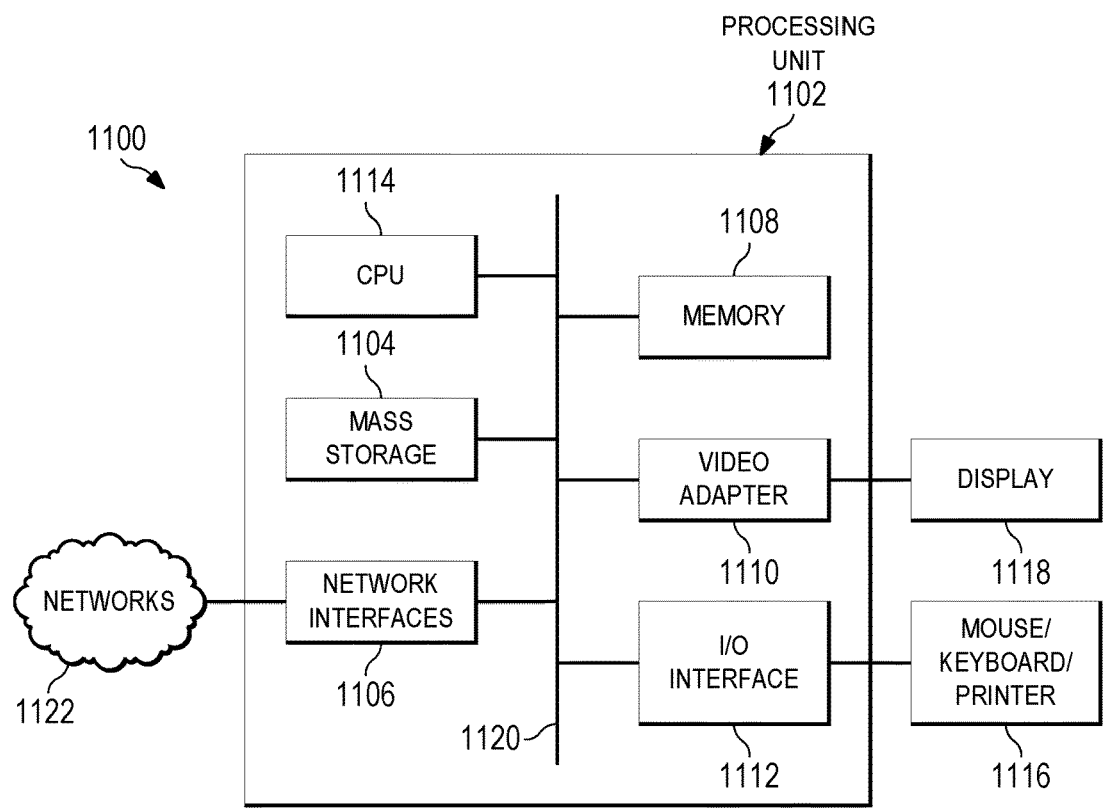
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 902. As illustrated, examples of input and output devices include a display 1118 coupled to the video adapter 1110 and a mouse/keyboard/printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an encoding unit/module, a setting unit/module, an applying unit/module, a generating unit/module, or a detecting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for sending a beam failure recovery request (BFRQ), the method comprising:
    setting, by a receiving device, a demodulation symbol to a first value to specify the BFRQ;
    encoding, by the receiving device, the demodulation symbol with a first orthogonal code sequence, thereby producing an encoded first sequence of symbols; and
    sending, by the receiving device, the encoded first sequence of symbols on a first physical uplink control channel (PUCCH) resource allocated for a first scheduling request (SR) transmission.

2. The method of claim 1, further comprising applying, by the receiving device, a cyclic time shift to the encoded first sequence of symbols.

3. The method of claim 1, further comprising:
    setting, by the receiving device, a second demodulation symbol to a second value to specify a SR signal;
    encoding, by the receiving device, the second demodulation symbol with a second orthogonal code sequence, thereby producing an encoded second sequence of symbols; and
    sending, by the receiving device, the encoded second sequence of symbols on a second PUCCH resource allocated for a second SR transmission.

4. The method of claim 3, wherein the first orthogonal code sequence and the second orthogonal code sequence are one and the same.

5. The method of claim 3, wherein the first orthogonal code sequence and the second orthogonal code sequence are different.

6. The method of claim 3, wherein the first value comprises a −1 and the second value comprises a +1.

7. The method of claim 1, further comprising:
    receiving, by the receiving device, a first resource allocation; and
    sending, by the receiving device, candidate beam information in accordance with the first resource allocation.

8. The method of claim 1, further comprising:
    receiving, by the receiving device, a second resource allocation; and
    sending, by the receiving device, a buffer status report (BSR) in accordance with the second resource allocation.

9. The method of claim 1, further comprising receiving, by the receiving device, a configuration of the BFRQ.

10. The method of claim 9, wherein the configuration is received in system information.

11. A method for operating a receiving device in a communications system with multiple component carriers, the method comprising:
- detecting, by the receiving device, a beam failure in a first component carrier;
- setting, by the receiving device, a demodulation symbol to a first value to specify a beam failure recovery request (BFRQ);
- generating, by the receiving device, the BFRQ; and
- sending, by the receiving device, the BFRQ in a second component carrier.

12. The method of claim 11, wherein the BFRQ sent using an uplink control channel or a non-contention based channel.

13. The method of claim 12, wherein the uplink control channel comprises a physical uplink control channel (PUCCH), and wherein the BFRQ is sent in the PUCCH in one of a modified scheduling request (SR) PUCCH format, a modified channel state information (CSI) PUCCH format, or a modified acknowledgement (ACK)/negative ACK (NACK) PUCCH format.

14. The method of claim 12, wherein the non-contention based channel comprises a physical random access channel (PRACH).

15. The method of claim 11, wherein generating the BFRQ comprises:
- encoding, by the receiving device, the demodulation symbol with an orthogonal code sequence thereby producing an encoded sequence of symbols, wherein the orthogonal code sequence conveys information related to an index of the first component carrier.

16. The method of claim 15, wherein sending the BFRQ comprises sending the encoded sequence of symbols in the second component carrier.

17. A receiving device comprising:
- one or more processors; and
- a computer readable storage medium storing programming for execution by the one or more processors, the programming including instructions to configure the receiving device to:
  - set a demodulation symbol to a first value to specify a beam failure recovery request (BFRQ),
  - encode the demodulation symbol with a first orthogonal code sequence, thereby producing an encoded first sequence of symbols, and
  - send the encoded first sequence of symbols on a first physical uplink control channel (PUCCH) resource allocated for a first scheduling request (SR) transmission.

18. The receiving device of claim 17, wherein the programming includes instructions to configure the receiving device to apply a cyclic time shift to the encoded first sequence of symbols.

19. The receiving device of claim 17, wherein the programming includes instructions to configure the receiving device to set a second demodulation symbol to a second value to specify a SR signal, encode the second demodulation symbol with a second orthogonal code sequence, thereby producing an encoded second sequence of symbols, and send the encoded second sequence of symbols on a second PUCCH resource allocated for a second SR transmission.

20. The receiving device of claim 17, wherein the programming includes instructions to configure the receiving device to receive a first resource allocation, and send candidate beam information in accordance with the first resource allocation.

21. The receiving device of claim 17, wherein the programming includes instructions to configure the receiving device to receive a second resource allocation, and send a buffer status report (BSR) in accordance with the second resource allocation.

22. A receiving device comprising:
- one or more processors; and
- a computer readable storage medium storing programming for execution by the one or more processors, the programming including instructions to configure the receiving device to:
  - detect a beam failure in a first component carrier of a communications system with multiple component carriers,
  - setting, by the receiving device, a demodulation symbol to a first value to specify a beam failure recovery request (BFRQ),
  - generate the BFRQ, and
  - send the BFRQ in a second component carrier.

23. The receiving device of claim 22, wherein the BFRQ sent using an uplink control channel or a non-contention based channel.

24. The receiving device of claim 23, wherein the uplink control channel comprises a physical uplink control channel (PUCCH), and wherein the BFRQ is sent in the PUCCH in one of a modified scheduling request (SR) PUCCH format, a modified channel state information (CSI) PUCCH format, or a modified acknowledgement (ACK)/negative ACK (NACK) PUCCH format.

25. The receiving device of claim 22, wherein the programming includes instructions to encode the demodulation symbol with an orthogonal code sequence thereby producing an encoded sequence of symbols, wherein the orthogonal code sequence conveys information related to an index of the first component carrier.

26. The receiving device of claim 25, wherein the programming includes instructions to configure the receiving device to send the encoded sequence of symbols in the second component carrier.

* * * * *